United States Patent [19]

Kabayashi et al.

[11] 4,037,262
[45] July 19, 1977

[54] SOLENOID OPERATED TRANSCRIBER MECHANISM

[75] Inventors: Minoru Kabayashi, Hachioji; Kazumi Miyazi, Fuchu, both of Japan

[73] Assignees: Olympus Optical Co., Ltd., Tokyo, Japan; Lanier Business Products Company, Atlanta, Ga.

[21] Appl. No.: 704,445

[22] Filed: July 12, 1976

[30] Foreign Application Priority Data

July 16, 1975 Japan .............................. 50-99217[U]
Sept. 30, 1975 Japan .......................... 50-133956[U]

[51] Int. Cl.² ............................................. G11B 15/10
[52] U.S. Cl. .................................................... 360/96
[58] Field of Search ......................... 360/96, 93, 13; 242/200, 202; 179/100.1 F, 100.1 DR

[56] References Cited

U.S. PATENT DOCUMENTS

| 3,567,229 | 3/1971 | Ridings et al. ........ 179/100.1 DR X |
| 3,784,127 | 1/1974 | Bachmann .......................... 360/96 X |
| 3,903,368 | 9/1975 | Okamura et al. ..... 179/100.1 DR X |
| B 453,432 | 3/1976 | Fukatsu ............................ 360/96 X |

FOREIGN PATENT DOCUMENTS 2,415,113   10/1975   Germany ................................ 360/96

Primary Examiner—John H. Wolff

[57] ABSTRACT

A transcriber i.e., a tape recorder for exclusive use in a sound reproduction comprises a mechanism for permitting a pinch roller and a reproducing magnetic head to be brought to a condition ready for operation by closing a main switch, and a playback switch and a backspace switch both designed to make an on-off operation by a person's foot.

4 Claims, 18 Drawing Figures

SOLENOID OPERATED TRANSCRIBER MECHANISM

BACKGROUND OF THE INVENTION

This invention relates to a device for exclusive use in the reproduction of a magnetic tape, i.e., a transcriber.

To reproduce a recorded magnetic tape for, for example, a typist to typewrite the content of the reproduced sound while he is hearing the same is one of the effective ways of using a magnetic tape recorder.

In such way of use, the tape recorder is not required to have a recording function and has only to have a function to exclusively perform a sound reproduction. A single purposed reproduction device so designed as to exclusively execute the reproduction of a recorded magnetic tape is called a transcriber and is already proposed.

The characterizing feature is this transcriber lies in the respect that the tape travel operation is carried out by means of a foot switch. This is because, since the typist uses his hands for typewritting, the transcriber operation is designed to be performed by foot operation. Accordingly, a conventional transcriber has been considerably complicated in construction.

On the other hand, since a casette tape came out, the magnetic tape has made a remarkable advance, followed by an increase in the demand for a transcriber using the cassette tape. Especially as for a compact match box-sized superminiaturized cassette tape which has been exploited by the present applicants, a cassette tape recorder therefor is also very small-sized and very convenient to carry, whereby the frequency of its use is high. Accordingly, a transcriber simple in construction and designed not to damage such a small-sized tape is being wanted.

SUMMARY OF THE INVENTION

Accordingly it is the object of the invention to provide a transcriber capable of satisfying the abovementioned requirements.

A transcriber according to an embodiment of the invention comprises a transcriber having a control circuit provided with a main switch for making on or off the electrical connection with a power source, a pinch roller, a capstan, a reproducing magnetic head, a winding shaft, and a rewinding shaft, comprising a sliding plate movable in response to the on-off operation of said main switch, a connection lever operatively connected to said sliding plate, a pinch roller supporting lever operatively connected to said connection lever and supporting said pinch roller, a head supporting member operatively connected to said connection lever and supporting said reproducing magnetic head, whereby when said main switch has been turned on, said sliding plate and connection lever are moved each by a prescribed amount, and in accordance with this movement said pinch roller supporting lever and head supporting member are moved to permit said pinch roller and magnetic head to be brought to a condition ready for operation, a playback solenoid, a playback switch for energizing and deenergizing said playback solenoid, a pushing member moved by energizing of said playback solenoid to move said connection lever, thereby to cause said pinch roller and magnetic head to be brought to an operative position, a selectively rotating mechanism for rotating said winding shaft by energizing of said playback solenoid, a backspace solenoid, a backspace switch for energizing and deenergizing said backspace solenoid, whereby when said backspace solenoid is energized, said playback solenoid is deenergized to permit said pinch roller and magnetic head to be brought to a condition ready for operation through said connection lever and said selectively rotating mechanism is caused to rotate said rewinding shaft.

This invention can be more fully understood from the following detailed description when taken in conjunction with the accompanying drawings, in which:

FIGS. 15 to 17 show a modification of the tape high speed-travel operation button wherein FIG. 15 is a sectional view, FIG. 16 is an exploded perspective view, and FIG. 17 is a sectional view showing the procedure of assembling the modification.

DETAILED DESCRIPTION OF THE INVENTION

A transcriber according to an embodiment of the invention will now be explained by reference to FIGS. 1 to 14.

Figure 1:
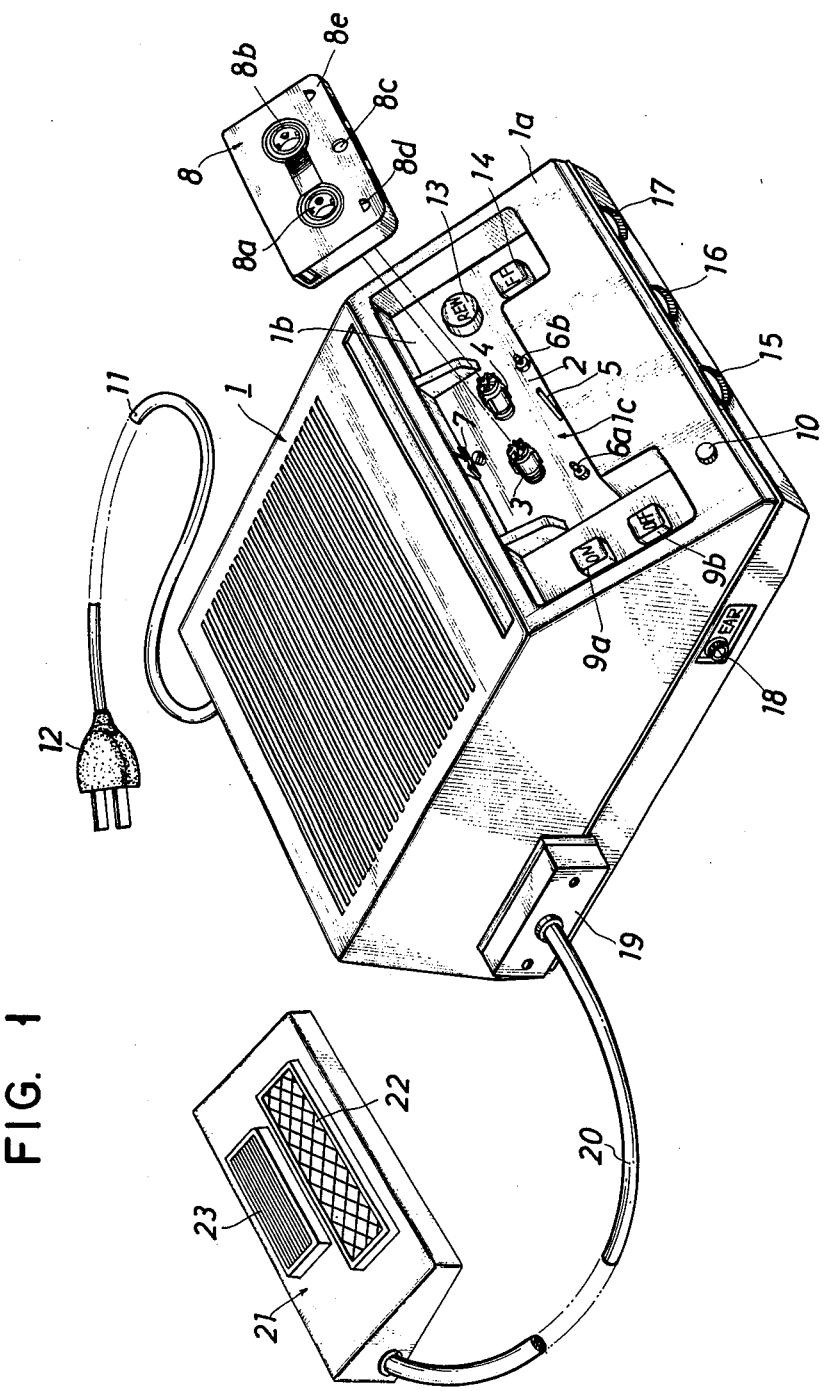
FIG. 1 is a perspective view of a transcriber according to an embodiment of the invention.

Referring now to FIG. 1, a transcriber is comprised of a body 1 put on, for example, a desk to undergo various kinds of manual operations, and a foot switch 21 put under the desk, namely, at the foot of an operator to undergo foot operations. The forward upper face of the body 1 assumes an inclined face section 1a which is downwardly inclined toward the operator side. This inclined face section 1a is formed with an inverted U-shaped recess 1b. In this recess 1b are provided a cassette-installing section and an on-off operation button-attaching section. Namely, a central part of the interior of the recess 1b constitutes a cassette-installing section 1c. Within the section 1c are disposed a tape winding shaft or post 3 passing through a dressing plate 2 constituting the bottom face of the recess 1b, a tape rewinding shaft or post 4, a capstan 5, cassette positioning pins 6a, 6b, and a cassette-positioning spring 7.

On the cassette-installing section 1c thus provided is detachably installed a so-called "microcassette tape" or "tape cassette" 8 (which is hereinafter referred to simply as "cassette"), which is the one exploited by the present inventors. As well known, a magnetic tape is received within the cassette formed into the size of a compact match box. Namely, at the left and right sides of the central part of the cassette 8 are rotatably disposed tape hubs 8a, 8b, respectively, to which are fixed ends of the tape, respectively. The tape is wound around one tape hub 8b and part thereof is tensioned along a forward window slot. At a central part of the rear face side of the tape tensioned along the torward window slot is provided a capstan insertion aperture 8c, while at portions biased toward the left and right ends of the cassette 8 are provided cassette positioning apertures 8d and 8e, respectively.

When the cassette 8 is installed onto the dressing plate 2 in a manner that the tape hubs 8a, 8b are fitted to the tape winding post 3 and the tape rewinding post 4 of the cassette-installing section 1c, respectively; the capstan insertion aperture 8c is fitted over the capstan 5; and the cassette positioning apertures 8d, 8e are fitted over the cassette positioning pins 6a, 6b, respectively, the rear face of the cassette is urged by the cassette positioning spring 7, whereby the cassette is installed at a prescribed position within the cassette-installing section 1c. Accordingly, the cassette 8 is detachably installed inclined with respect to the transcriber body 1.

Within a concave portion at the left side (see FIG. 1) of the installing section 1c are disposed on and off operation buttons 9a, 9b of a main switch. The operation buttons 9a, 9b are so designed as to turn the main switch on and off by operating seesaw type opening and closing members as later described. Namely, when the operation button 9a is depressed, the main switch is turned on, while when the operation button 9b is depressed, the main switch is turned off. When the main switch is turned on, a power lamp 10 is lit to display that a power source is connected to the transcriber. Namely, a power source cord 11 led out from the rear face of the transcriber body 1 is connected to a commercially used power source through a plug 12, and upon depression of the operation button 9a the power lamp 10 is lit.

Within a concave portion at the right side (see FIG. 1) of the installing section 1c are disposed a tape rewinding operation button 13 and a tape high speed operation button 14.

On a forward portion of the transcriber body 1 immediately proceding to the above-mentioned inclined face section 1a are exposed part of a sound volume controlling knob 15, part of a sound quality controlling knob 16 and part of a tape speed controlling knob 17. Besides, at a forwardly biased portion of the left side (in FIG. 1) of the transcriber body 1 is disposed an earphone jack 18. Further, at a rearwardly biased portion of said left side face is provided a plug 19, to which said foot switch 21 is connected through a conductive cord 20. The foot switch 21 is comprised of a playback switch and a backspace switch as later described. When one foot pedal 22 is depressed, the playback switch is changed over to an operation side to permit the transcriber to perform its reproducing operation. Further, when the other foot pedal 23 is depressed, the backspace switch is changed over to an operation side to permit the tape to be rewound.

Figure 2:
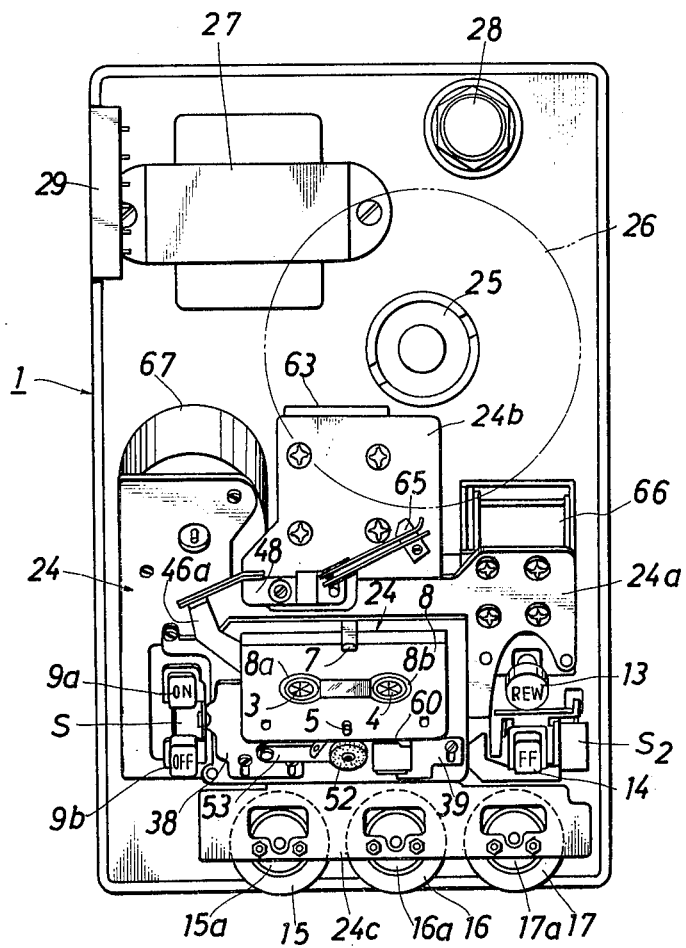
FIG. 2 is a plan view of a body of the transcriber exploded by removing the upper half of an outer casing of the transcriber.

Within the transcriber body 1 having the foregoing construction, electric parts are arranged as shown in FIG. 2. FIG. 2 is a plan view of the transcriber body 1 having removed the upper half of its outer casing, and below the cassette-installing section 1c is disposed a substrate 24 on which are attached various parts constituting a heart section of the transcriber body 1. Disposed rearwardly of the substrate 24 is a speaker 26 fitted to a speaker-attaching portion 25. From this speaker 26 a reproduced sound of the tape is generated by known technique. The speaker 26 is fitted to the attaching portion 25 so that a cone thereof may oppose the upper face of the upper half of the outer casing of the transcriber body 1.

Disposed by a known technique rearwardly of the speaker 26 are a power source transformer 27 and a fuse 28. Further, disposed also by a known technique on a left side wall of the transcriber body 1 is a jack 29 for connecting thereto the above-mentioned foot switch 21.

Figure 6A:
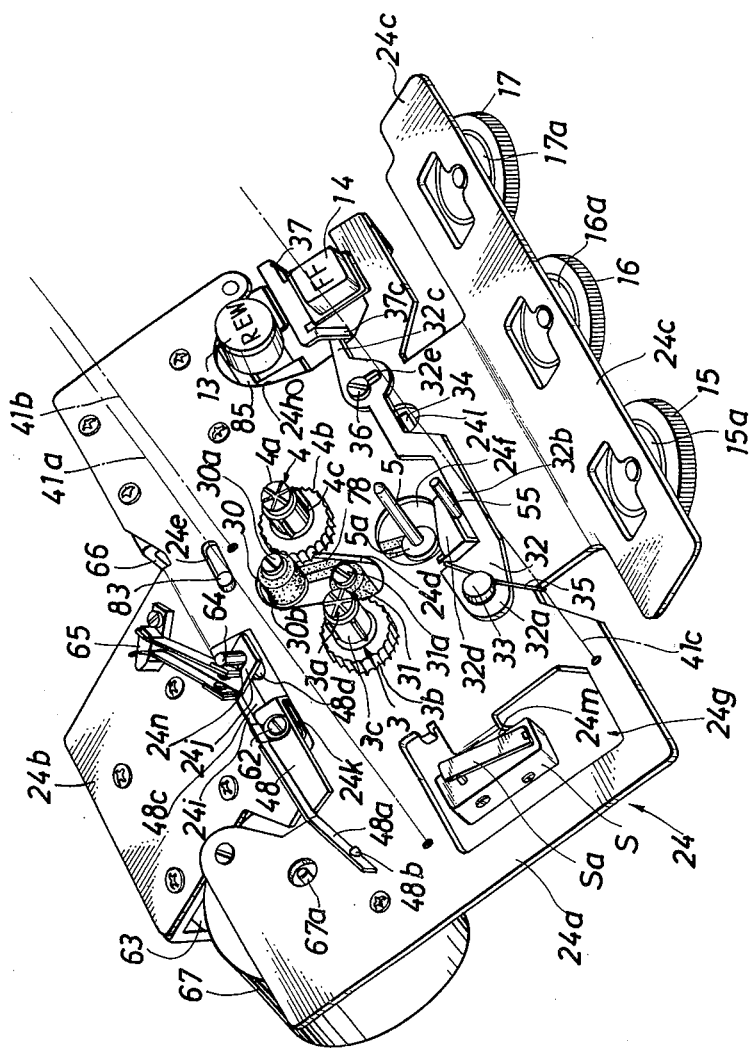
FIGS. 6a and 6b are exploded perspective views showing the operating parts disposed on the upper face side of the substrate shown in FIG. 3.
Figure 6B:
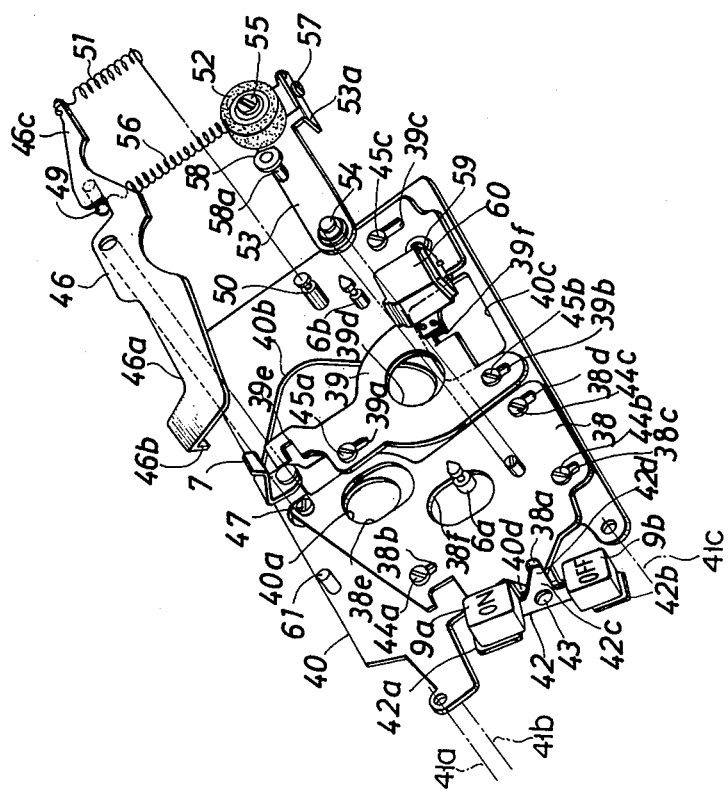

The substrate 24, as shown in FIG. 6, has an inclined face section 24a parallel to said inclined face section 1a (see FIG. 1) of the outer casing of the transcriber body 1. From respective central parts of rearward and forward side edges of the inclined face section 24a are extended horizontal face sections 24b, 24c so bent as to be made horizontal, respectively.

Figure 4:
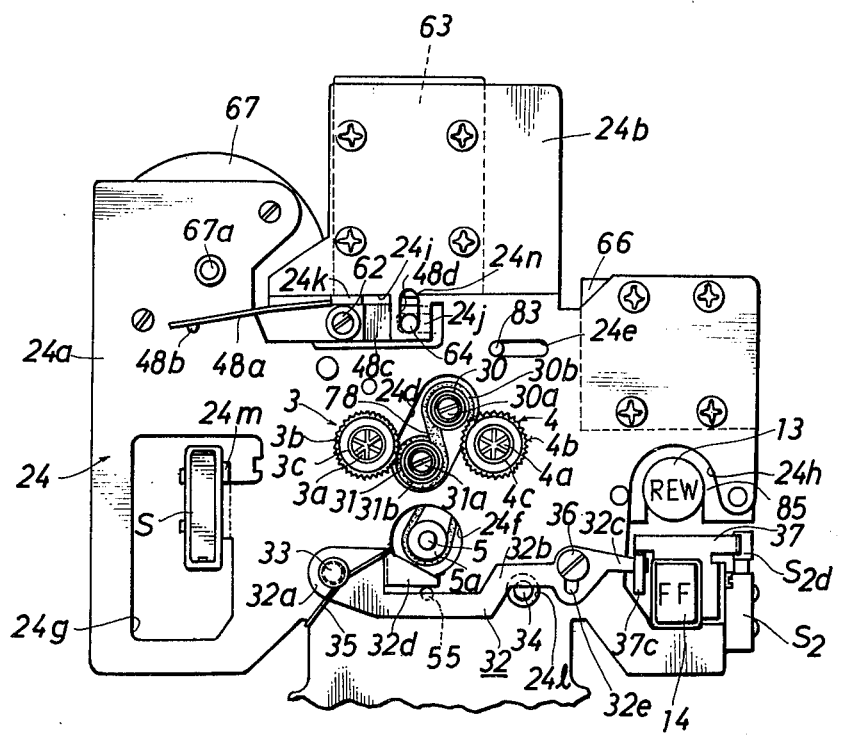
FIG. 4 is an enlarged plan view showing operating parts mounted on an upper face of the substrate.

As shown in FIGS. 4 and 6, the inclined face section 24a of the substrate 24 has formed is bored with a drive roller-projecting aperture 24d at its central position, a solenoid pin-moving elongate aperture 24e at a rearward, rightward position of the projecting aperture 24d, a capstan passing aperture 24f at a forward position of the projecting aperture 24d, a control pin passing aperture 24l at a forward, rightward position of the aperture 24f, a main switch attaching aperture 24g at a leftward position of the aperture 24d, and an rewinding switch and high speed travel switch-disposing aperture 24h at a rightward position of the aperture 24d.

At that position of a bent portion between the upper-located horizontal face section 24b and the inclined face section 24a which is biased toward the section 24a is bored a laterally elongate aperture 24i, into which two projecting pieces 24j, 24k are extended from the horizontal face section 24b. As shown in FIGS. 2 and 6, attached to the lower-located horizontal face section 24c are a sound quantity controlling means 15a and its knob 15, a sound quality controlling means 16a and its knob 16, and a tape speed controlling means 17a and its knob 17.

As shown in FIGS. 4 and 6, on the inclined face section 24a are disposed the tape winding post 3 and the tape rewinding post 4, which are disposed on right and left sides of the drive roller-projecting aperture 24d, respectively, and are comprised of drive gears 3b, 4b rotatably fitted, respectively, to shafts 3a, 4a erected on the substrate 24 and tape hub driving wheels 3c, 4c frictionally engaged, respectively, with the gears 3b, 4b. Pressed as required against the drive gears 3b, 4b are drive rollers 30, 31, respectively, as later described allowed to pass through said projecting aperture 24d, thereby driving the drive gears 3b or 4b.

At that position of the substrate which is located forwardly of the passing aperture 24f of the capstan 5 is disposed control lever 32, which is allowed to laterally lie. A base portion 32a thereof located leftwardly of the passing aperture 24f is rockably attached to the substrate 24 by means of a support shaft 33. A free end portion 32b of the control lever 32 is allowed to pass across an upper half portion of the passing aperture 24l and a tip end portion 32c thereof is extended into said switch-disposing aperture 24h. Further, at that portion of the control lever 32 which is biased toward the base portion 32a is formed a bent short arm 32d. The control lever 32 thus formed is fited over the support shaft 33 and normally has applied thereto a clockwise rocking force acting with the support shaft 33 as a center. But this rocking movement is checked by engagement of one end of a circular arc-shaped elongate aperture 32e bored in the free end portion 32b, with a headed screw 36 attached to the substrate 24 and having the elongate aperture 32e. Accordingly, the range of the rocking movement of the control lever 32 is defined by both longitudinal opposite ends of the circular arc-shaped elongate aperture 32e. This control lever 32 plays the role to control the movement of said control pin 34 and a pinch roller as later described.

Into the above-mentioned main switch S-attaching aperture 24g of the substrate 24 is inserted a switch attachment piece 24m extending leftwardly of the illustration and integrally with the substrate 24, said piece 24m being fitted with the main switch S. This main switch S is allowed to make an on-off operation by means of a main switch on-off operation member as later described making a seesaw movement through depression of the switch operating buttons 9a, 9b.

Within the high speed travel switch-disposing aperture 24h provided at a rightward position of the substrate 24 are disposed said tape rewinding operation button 13 and a switch on-off operation member 37 with said tape high speed travel operation button 14. A switch on-off operation mechanism made operative by means of these operation buttons 13, 14 will be described later.

Figure 3:
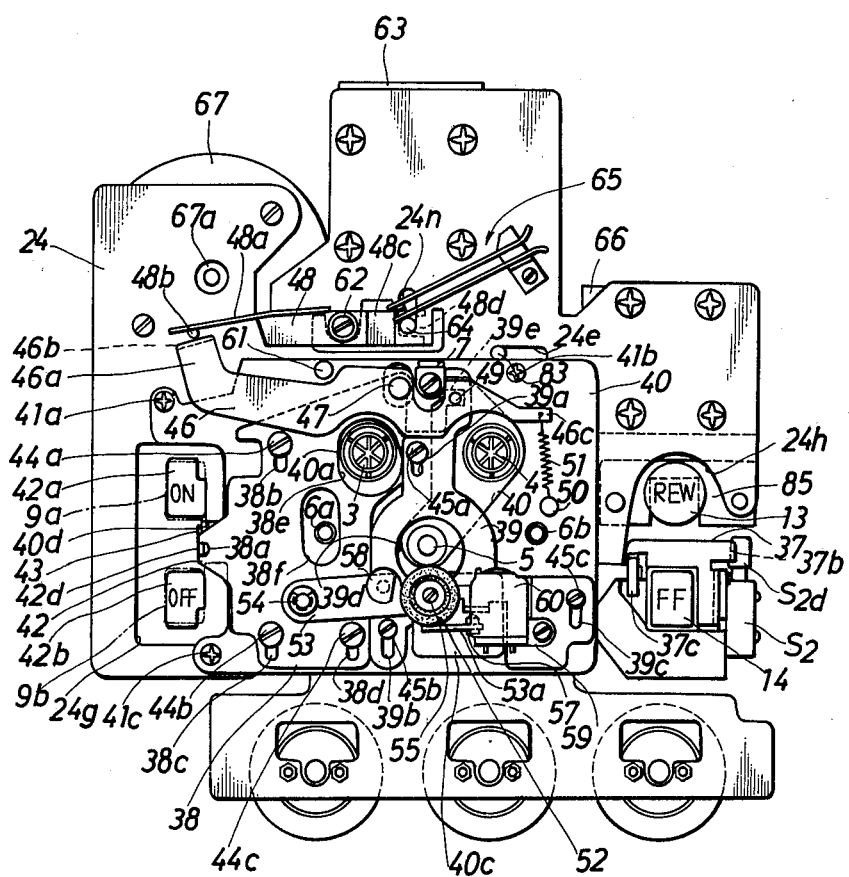
FIG. 3 is an enlarged plan view showing operating parts disposed on the upper face side of a substrate of the body.

As shown in FIGS. 3 and 6, on the upper face of the substrate 24 fitted with the foregoing various parts or sections is disposed on auxiliary substrate 40 having slidably fitted thereto a sliding plate 38 and a magnetic head supporting member 39, said auxiliary substrate 40 being fixed to the substrate 24 by means of screws 41a to 41c. The auxiliary substrate 40 is bored with an aperture 40a for permitting passage therethrough of said tape winding post 3, an aperture 40b for permitting passage therethrough of said tape rewinding post 4 and said capstan 5, and a rectangular aperture 40c situated forwardly of the aperture 40b and provided at a position biased toward the lower side edge of the substrate 40, and in addition is provided with said cassette positioning pins 6a, 6b and said cassette positioning spring 7 at their prescribed positions, respectively.

At that intermediate position of the left side edge (FIGS. 3 and 6) of the auxiliary substrate 40 which corresponds to the position at which the switch S is attached is provided a bent piece 40d which is bent toward the above-mentioned main switch S-attaching aperture 24g, said bent piece 40d being attached with said main switch on-off operation member 42 making a seesaw movement.

Figure 10:
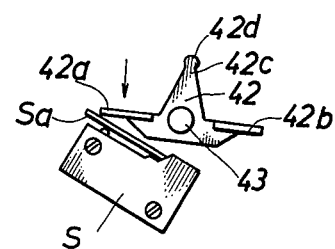
FIG. 10 is a side view showing an on-off operation member of a main switch.

The main switch on-off operation member 42 has its rocking fulcrum attached to the bent piece 40d by means of a headed shaft 43. On one arm 42a of the on-off operation member 42 extending rearwards is fixed said on operation button 9a, while on the other arm 42b of the on-off operation member 42 is fixed said off operation button 9b. The tip end portion 42d of that intermediate arm 42c (see FIG. 10) of the operation member 42 which extends upwards from said rocking fulcrum is fitted into a forked portion 38a of the below-mentioned sliding plate 38. The main switch on-off operation member 42 thus attached is disposed above the main switch S. Accordingly, when depressing the on operation switch 9a, the on-off operation member 42, as shown in FIG. 10, is allowed to make a counterclockwise seesaw movement with the headed shaft 43, so that the one arm 42a is caused to depress an actuator Sa of the switch S, whereby the main switch S is turned off.

The sliding plate formed with said forked portion 38a is disposed at the left half of the auxiliary substrate 40 (FIGS. 3 and 6) in a manner overlapped thereon by idle insertion of headed screws 44a to 44c fixedly provided on the auxiliary substrate 40 into elongate guide apertures 38b to 38d bored in the sliding plate 38 at three portions thereof, and the range of the rearward sliding movement of the sliding plate 38 is defined or limited by means of the elongate guide apertures 38b to 38d. The sliding plate 38 is bored with an elongate aperture 38e for permitting passage therethrough of said tape winding post 3 and an escapement aperture 38f for permitting passage therethrough of said cassette positioning pin 6a.

The magnetic head supporting member 39 is slidably disposed over the right half (FIGS. 3 and 6) of the auxiliary substrate 40 in the same direction as that in which the sliding plate 38 is allowed to slide. Namely, the head supporting member 39 is disposed on the auxiliary substrate 40 by idle insertion of headed screws 45a to 45c provided on the auxiliary substrate 40 into elongate guide apertures 39a to 39c bored at three portions of the head supporting member 39. At a portion of the head supporting member 39 below-biased from the central part thereof is bored a circular aperture 39d for permitting passage therethrough of said capstan. This capstan-passing aperture 39d is allowed to overlap on a forward end portion of the aperture 40b bored in the auxiliary substrate 40. The capstan 5 allowed to pass from below through both said apertures 40b, 39d is extended through the dressing plate 2 shown in FIG. 1 to be extended into the cassette-installing section 1c.

The tape winding post 3 is passed through the aperture 40a bored in the auxiliary substrate 40 and the aperture 38e bored in the sliding plate 38 and is passed through the dressing plate 2 shown in FIG. 1 to be extended into the cassette-installing section 1c. Further, the tape rewinding post 4 is passed through a right end portion of the aperture 40a bored in the auxiliary substrate 40 and is penetrated through the dressing plate 2 shown in FIG. 1 to be extended into the cassette-installing section 1c.

Further, the cassette-positioning pins 6a, 6b and spring 7 provided on the auxiliary substrate 40 are passed through the dressing plate 2 shown in FIG. 1 to be extended into the cassette-installing section 1c.

Referring to FIGS. 3 and 6, above the sliding plate 38 and the head supporting member 39, a connection lever 46 is disposed bridged between both members 38, 39. The connection lever 46 has its rocking fulcrum pivoted to a support shaft 47 fixedly erected on a backward portion of the sliding plate 38. At an end portion of one leftwardly extending arm 46a is formed a bent portion 46b which is downwardly bent toward the substrate 24 and is so designed as to be pushed by means of a pushing member 48 as later described. On the other rightwardly extending arm 46c is fixedly erected a downwardly extending pin 49, which is engaged with a notch 39e formed at a rearward portion of the head supporting member 39. Between an end portion of said other arm 46c and a pin 50 fixedly erected on the auxiliary substrate 40 is stretched a tension spring 51 to urge the connection lever 46 so as to permit it to be clockwise rocked about its support shaft 47. As a result, the connection lever 46 is normally caused to space a pinch roller and a reproducing magnetic head as later decribed away from an installed tape. Such a rocking movement of the connection lever 46 is normally checked by engagement of the pin 49 with the notch 39e of the head supporting member 39 and also by regulation of the sliding movement of the member 39 by means of the elongate guide apertures 39a to 29c thereof.

Figure 14:
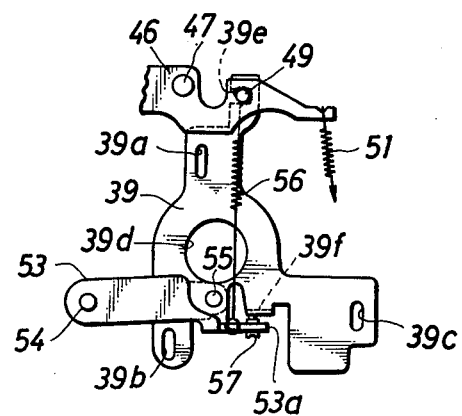
FIG. 14 is a plan view showing a connection condition of a connecting lever with a pinch roller supporting lever.

At a forwardly biased part of the sliding plate 38 and the head supporting member 39 is disposed a pinch roller supporting lever 53 in a manner bridged between both said plate 38 and member 39. The lever has its base portion rockably pivoted to a support shaft 54 fixedly erected on the sliding plate 38 and has its free end portion extended up to a position near to the capstan-passing aperture 39d. To a tip end of that free end portion is rockably fitted a pinch roller 52 by means of a support shaft 55. On a lower side edge of that tip end is provided a bent piece 53a downwardly bent toward the auxiliary substrate 40. Between this bent piece 53a and the downwardly extending pin 49 of the connection lever 46 is bridged a tension coil spring 56 (see FIG. 14), which thus connects the connection lever 46 and the pinch roller supporting lever 53. This connected condition, as shown in FIG. 14, is designed to be adjusted as required by controlling the interval between the bent pieces 53a and 39f through operating a headless screw 57 screwed into the bent pieces 53a and having its tip end allowed to about on the bent piece 39f of the head supporting member 39. The support shaft 55 for rotatably supporting the pinch roller 52 at the tip end portion of the pinch roller supporting lever 53 is extended also below the supporting lever 53 and is passed through the angular aperture 40c of the auxiliary substrate 40 to abut on a forward side edge of the bent short arm 32d of the control lever 32 (see FIGS. 4 and 6). Accordingly, under the condition wherein the control lever 32 is rocked counterclockwise about the support shaft 33 against the biasing force of the spring 35, the pinch roller supporting lever 53 can be rocked in a manner following the sliding movement of the head supporting member 39.

The pinch roller supporting lever 53 having the foregoing construction is also provided, as shown in FIGS. 3 and 6, with a cassette keeper 58. This cassette keeper 58 is constituted by a partly cut off circular plate and is secured to a tip end portion of a support shaft 58a fixedly erected on the lever 53. The cassette keeper 58, when the pinch roller 52 has been pressed against the capstan 5 through the installed tape, is engaged with part of a rear side edge of the installed cassette 8, thereby preventing the installed cassette 8 from escaping from the cassette-installing section 1c (see FIG. 1) upon operation of the transcriber. At a forward, rightward portion of the head supporting member 39 having the foregoing construction is fixed a reproducing magnetic head 60 through an attachment member 59. When the head supporting member 39 has been caused to slide toward the tape rewinding shaft 4, the magnetic head 60 has its head face allowed to abut on a magnetic tape face of the installing cassette 8 to be brought to a condition ready for reproduction. Note here that a pin 61 erected on the auxiliary substrate 40 in the vicinity of a rear side edge thereof is a stopper pin for regulating the moving range of the connection lever 46.

In this way, on the inclined face section 24a of the substrate 24 are disposed as required the tape winding and rewinding posts 3, 4, the control lever 32, the auxiliary substrate 40, the sliding plate 38, the head supporting member 39, the connection lever 46, the pinch roller supporting lever 53, etc. in such a manner as to be operatively related to each other. On a projecting piece 24k provided toward the inclined face section 24a from the horizontal face section 24b is provided the above-mentioned pushing member 48 as shown in FIGS. 3, 4 and 6. This pushing member 48 is attached to the projecting piece 24k by a headed shaft 62 so as to be rocked about the same 62, and one arm 48a thereof is bent in a manner made substantially perpendicular to the face section 24b, and a tip end portion thereof is opposied to the bent portion 46b of the connection lever 46, and a pushing element 48b attached to that tip end portion is in abutment with the bent portion 46b. Further, the other arm 48c of the pushing member 48 is first bent toward an underside of the substrate 24 and then is bent horizontal, and is extended to a position below the projecting piece 24j provided adjacent the projecting piece 24k, and a tip end of said other arm 48c is formed with a forked portion 48d. This forked portion 48d is fitted over a pin 64 vertically erected on a plunger 63a (see FIG. 5) of a playback solenoid 63 as later described. The pin 64 is passed through an elongate aperture 24n bored in the projecting piece and is extended to a position above the projecting piece 24j, and when the solenoid 63 has been operated, is rearwardly moved in accordance with the rearward movement of the plunger 63a to cause the pushing member 48 to be rocked and also to turn off a motor control circuit switch 65 as later described disposed on the horizontal face section 24b.

Figure 5:
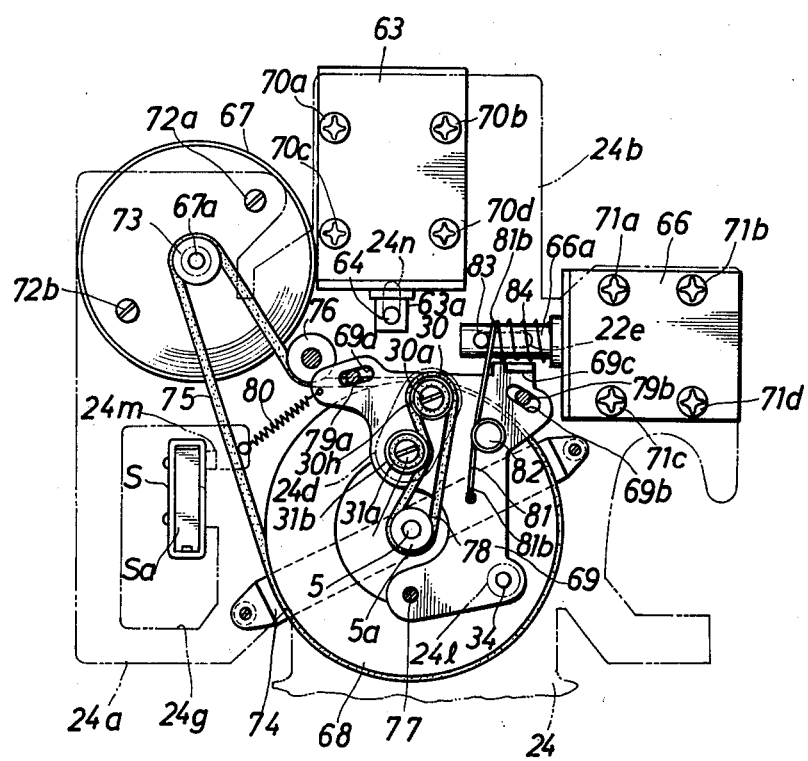
FIG. 5 is an enlarged plan view of a tape driving mechanism disposed below the substrate.

In an area below the substrate 24, as shown in FIG. 5, are disposed the playback solenoid 63, a back space solenoid 66, a drive motor 67, a capstan driving flywheel 68 and a driving force transmission changing-over plate 69. The playback solenoid 63 is attached to an underside of the horizontal face section 24b of the substrate 24 by means of attachment screws 70a to 70c. The back space solenoid 66 is disposed at an area below a rightward portion of the inclined face section 24a of the substrate 24 in a direction perpendicular to the playback solenoid 63 and is attached to an underside of the inclined face section 24a of the substrate 24 by means of attachment screws 71a to 71d.

the driving motor 67 is attached by means of attachment screws 72a, 72b to that underside portion of the inclined face section 24a of the substrate 24 which is located leftwardly of the playback solenoid 66, and to an output shaft 67a thereof is fixed an output pulley 73. The flywheel 68 has its central portion fixed to the capstan 5, and the capstan 5 is rotatably attached through a bearing (not shown) to a supporting member 74 fitted to a central underside of the inclined face section 24a of the substrate 24. Between the flywheel 68 and the output pulley 73 of the motor is stretched an endless belt 75, whereby a rotational force of the motor 67 is transmitted to the capstan 5 through the flywheel 68. Further, the endless belt 75 has its tension controlled to a maximum value by means of a tension roller 76.

The driving force transmission change-over plate 69 plays the role to change over, as required, a driving force permitting rotation of the tape winding post 3 or tape rewinding post 4 in relation to the rotation of the capstan 5, thereby transmitting that driving force to the post 3 or 4. This change-over plate 69 is disposed below the inclined face section 24a and above the flywheel 68.

The change-over plate 69 has its rocking fulcrum pivoted to a downwardly extending shaft 77 fixedly erected on the inclined face section 24a and has its free end portion allowed to extend to a position below the aperture 24d bored at the central part of the inclined face section 24a of the substrate 24. To those portions of the change-over plate 69 which correspond to the aperture 24d are attached said driving rollers 30, 31, respectively. On said those portions of the change-over plate 69 are erected a pair of support shafts 30a, 31a passing through the aperture 24d. As shown in FIGS. 4, 5 and 6, over the rearward support shaft 30a and the forward support shaft 31a are rotatably fitted the driving roller 30 and the driving roller 31, respectively. When the change-over plate 69 has been rocked clockwise about the shaft 77, one driving roller 30 is brought into engagement with a driving gear 4b of the tape rewinding shaft 4. On the contrary, when the change-over plate 69 has been rocked counterclockwise about the shaft 77, the other driving roller 31 is brought into engagement with a driving gear 3b of the tape winding shaft 3. The driving rollers 30, 31 have pulleys 30b, 31b thereunder, respectively. Further, the capstan 5 has a pulley 5a above the flywheel 68, and between this pulley 5a and said pulley 30b is bridged an endless belt 78, which is arranged to have part of its outer periphery allowed to abut also against the pulley 31b located intermediate between the pulleys 5a and 30b. As a result, when the capstan 5 has been rotated, both pulleys 30b, 31b are rotated in the opposite directions to each other through the belt 78, thereby driving the driving rollers 30, 31 to rotation.

On that portion of the change-over plate 69 which corresponds to the aperture 24l bored in the substrate 24 is erected the above-mentioned control pin 34. The rearward part of the change-over plate 69 is bored with partially circularly arcuate elongate guide apertures 69a, 69b, through which are idly inserted downwardly extending pins 79a, 79b fixedly erected on the under side of the substrate 24. Further, the change-over plate 69 is urged by a tension coil spring 80 bridged between the substrate 24 and the change-over plate 69, so as to be rocked counterclockwise about the support shaft 77. Normally, however, this rocking movement of the change-over plate 69 is restricted, as shown in FIGS. 4 and 6, by abutment of the control pin 34 against part of the forward side edge of the control lever 32. Under this limited condition, therefore, both the driving rollers 30, 31 on the change-over plate 69 are kept in a suspended condition without abutting against the drive gears 3b, 4b of the tape winding and rewinding posts 3, 4.

Further, the change-over plate 69 is connected to the back space solenoid 66 by means of a torsion spring 81. As shown in FIG. 5, on the change-over plate 69 is fixedly erected a winding shaft 82 for being wound or fitted with the intermediate portion of the spring 81. One end portion 81a of the spring 81 is engaged with a pin 83 erected on a plunger 66a of the solenoid 66. The other end portion 81b of the spring 81 is fixed to the change-over plate 69. On a moving passage of said end portion 81a of the spring 81 is located a rising piece 69c of the change-over plate 69, and this rising piece 69c is arranged to be moved by means of said one end portion 81a of the spring 81. Further, over the plunger 66a of the back space solenoid 66 is fitted a spring 84 for permitting a return movement of the plunger 66a, and the pin 83 erected on the plunger 61a is arranged to be guided by means of the elongate guide aperture 24e of the substrate 24.

The parts and sections arranged behind the substrate 24 are constructed as stated above. Hereinafter, switch mechanisms operated, respectively, by the tape rewinding operation button 13 and the tape high speed operation button 14 disposed at the rightward portion of the substrate 24 is explained.

Figure 7:
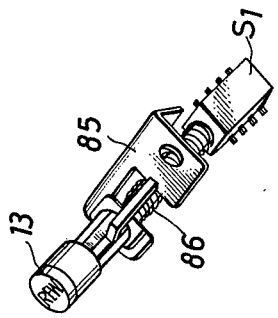
FIG. 7 is a perspective view of a tape rewinding operation button of the transcriber.

The switch mechanism changed-over by the tape rewinding operation button 13 is constructed as shown in FIG. 7. This mechanism is constituted by a well known push button switch mechanism, and the operation button 13 and a change-over switch $S_1$ are attached to a switch-attaching plate 85 fixed bridged over the aperture 24h of the substrate 24 (see FIGS. 3, 4 and 6). In this switch mechanism, once the operation button 13 has been depressed, the switch $S_1$ is changed over to keep the operation button 13 at its depressed condition. When the operation button 13 is next depressed, the switch $S_1$ is changed over to its initial condition to permit the operation button 13 to return to its initial condition by operation of a return spring 86.

Figure 8:
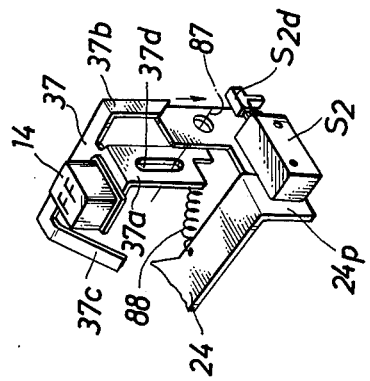
FIG. 8 is a perspective view of a tape high speed-travel operation button of the transcriber.

On the other hand, the switch change-over mechanism based on the operation of the tape high speed travel-operation button 14 has such a construction as shown in FIG. 8. Namely, a change-over switch $S_2$ is fixed to a bent piece 24p formed at a forward, rightward edge portion of the substrate 24, and the tape high speed travel-operation button 14 is fixed on the switch on-off operation member 37 disposed within the aperture 24h of the substrate 24. This switch on-off operation member 37 has three downwardly bent pieces 37a, 37b and 37c, in which the bent piece 37a is formed relatively large in width and is bored with a vertically extending elongate aperture 37d. The bent piece 37a is juxtaposed with the bent piece 24p of the substrate 24, and is attached by an attachment shaft 87 in a manner vertically movable relative to the bent piece 24p. Normally, the bent piece 37a is upwardly raised by means of a tension coil spring 88 bridged between the bent piece 37a and the substrate 24, to be kept at a prescribed position. Further, the bent piece 37b has its tip end located above an actuator $S_{2d}$ of the switch $S_2$ so that when the operation button 14 has been depressed, said tip end may push the actuator $S_{2d}$ to change over the switch $S_2$.

The bent piece 37c is formed on that arm portion of the switch on-off operation member 37 which extends in the opposite direction to that in which an arm formed with the bent piece 37b extends, and, as shown in FIGS. 3, 4 and 6, is extended in an inclined manner up to a position above the tip end portion 32c of the control lever 32. When the opertion button 14 has been depressed, the bent piece 37c pushes said tip end portion 32c by means of that inclined portion to cause the control lever 32 to be rocked counterclockwise about the support shaft 33 against the biasing force of the spring 35.

The tape rewinding push button switch mechanism and the tape high speed travel-push button switch mechanism have the above-mentioned respective constructions.

Figure 9:
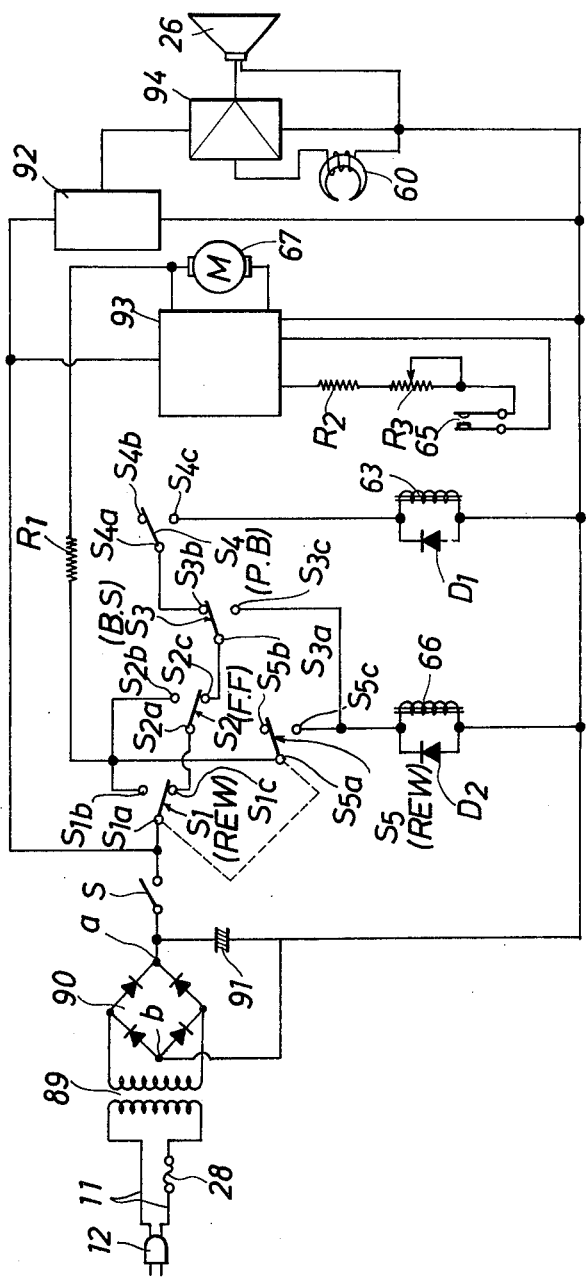
FIG. 9 is an electric circuit diagram for driving the transcriber.

Hereinafter, an electric circuit of the transcriber having the foregoing construction is described. This circuit is constructed as shown in FIG. 9. The power source cord 11 having connected thereto a power source plug 12 shown in FIG. 1 is connected, as shown in FIG. 9, to a primary side of a power source transformer 89 through a fuse 28 (see FIG. 2). To a secondary side of the transformer 89 is connected an input terminal of an all-wave rectifier circuit 90, between output ends $a$, $b$ of which are connected a constant voltage circuit 92 and a motor speed control circuit 93 through a smoothing capacitor 91 and said main switch S. An output voltage from the constant electric circuit 92 is supplied to an amplifier circuit 94. This amplifier circuit 94, as well known, is designed to amplify a reproducing output from the reproducing magnetic head 60 to feed it to a speaker 26.

On the other hand, to one output end $a$ of the rectifier circuit 90 is connected a movable contact piece terminal $S_{1a}$ of the tape rewinding change-over switch $S_1$ through the main switch S. The change-over switch $S_1$ is constructed into an interlocking switch pair, and a movable contact piece terminal $S_{5a}$ of another interlocking switch pair $S_5$ is connected to one stationary terminal $S_{1b}$ of the switch $S_1$. A movable contact piece of the switch $S_1$ is normally kept changed over to a stationary terminal $S_{1c}$, while a movable contact piece of the switch $S_5$ is normally kept changed over to one stationary terminal $S_{5b}$. The stationary terminal $S_{1c}$ is connected to a movable contact piece terminal $S_{2a}$ of a tape high speed travel-change-over switch $S_2$, and one stationary terminal $S_{2b}$ of the switch $S_2$ is connected to the stationary terminal $S_{1b}$. The stationary terminal $S_{1b}$ is connected directly to one end of the motor 67 through a resistor $R_1$. The other stationary terminal $S_{2c}$ of the switch $S_2$ is connected to a movable contact piece terminal $S_{3a}$ of a foot switch $S_3$ designed to be changed over by the back space foot pedal 23 (see FIG. 1). A stationary terminal $S_{3c}$ is connected to the other stationary terminal $S_{5c}$ of the switch $S_5$. Between the stationary terminal $S_{5c}$ and the other output terminal $b$ of the rectifier circuit 90 is connected the above-mentioned back space solenoid 66. One stationary terminal $S_{3b}$ of the switch $S_3$ is connected to a movable contact piece terminal $S_{4a}$ of a foot switch $S_4$ designed to be changed over by the play back foot pedal 22 (see FIG. 1). The foot switch $S_4$ has its movable contact piece normally kept in contact with one stationary terminal $S_{4b}$, and is so designed that when the pedal 22 (see FIG. 1) is depressed, said movable contact piece may be changed over to the other stationary terminal $S_{4c}$. Between the stationary terminal $S_{4c}$ and the above-mentioned output end $b$ is connected said play back solenoid 63.

The normally opened switch 65 disposed on the horizontal face section 24b (see FIGS. 3 and 6) of the substrate 24 has its both movable contact pieces connected to a control input terminal of the motor speed control circuit 93 serially through resistors $R_2$, $R_3$. When the solenoid 63 has been operated to permit its plunger 63a to enter the solenoid 63, thus to cause both said movable contact pieces of the switch 65 to contact each other, whereby the switch 65 is closed, the motor 67 is stably controlled to a specified rotation speed by the motor rotation speed control circuit 93. Note here that in FIG. 9 diodes $D_1$, $D_2$ connected in parallel with the solenoids 63, 66 are for the purpose of absorbing a back electromotive voltage.

The present transcriber has the foregoing construction.

Hereinafter, the operation of the transcriber is explained. Assume now that, as shown in FIG. 1, a recorded cassette tape 8 is installed into the cassette-installing section 1c of the transcriber body 1; and the plug 12 is connected to the commercially used power source (not shown), thereby to connect the power to the transcriber through the cord 11.

Figure 11:
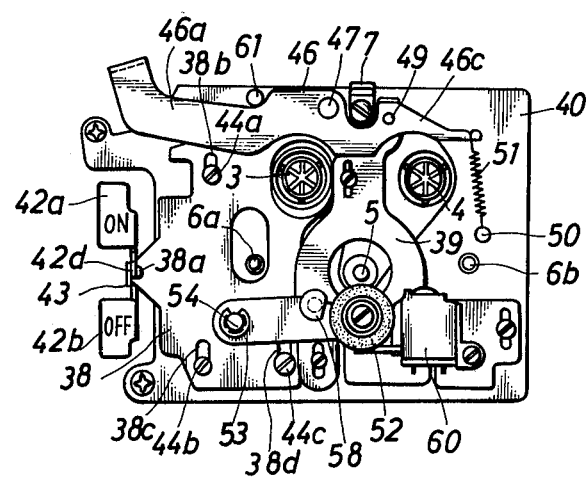
FIG. 11 is a plan view showing a condition, at the time when the main switch is closed, wherein the operating members disposed on an auxiliary substrate are in operation.

When the main switch on operation button 9a is depressed, the switch on-off operation member 42 is rocked counterclockwise about the headed shaft 43 as shown in FIG. 10. As a result, the actuator Sa of the main switch S is pushed by means of the arm 42a of the operation member 42, whereby the main switch S is closed. Further, when the operation member 42 is rocked counterclockwise, its intermediate arm 42c is also rocked counterclockwise. Therefore, the forked portion 38a of the sliding plate 38 is fitted over the tip end portion 42d of the intermediate arm 42c. As a result, as shown in FIG. 11, the sliding plate 38 is allowed to slide relative to the auxiliary substrate 40 to be moved inwardly of the transcriber body 1 (upwardly of FIG. 11). This sliding amount of the sliding plate 38 is regulated by means of the elongate guide apertures 38b to 38d bored in the sliding plate 38. When the sliding plate 38 is moved, the connection lever 46 supported on the sliding plate 38 by means of the support shaft 47 is moved jointly with the sliding plate 38 and, at the position in which the arm 46a abuts on the stopper pin 61, is stopped. When the connection lever 46 is moved upwardly of FIG. 11, the head supporting member 39 having its notch 39e (see FIGS. 3, 6 and 14) engaged with the downwardly extending pin 49 of the arm 46c is moved in the same direction as that in which the sliding plate 38 is moved. This moving amount of the head supporting member 39 is regulated by a position for permitting abutment of the connection lever 46 against the stopper pin 61 unlike the moving amount of the sliding plate 38, and therefore is almost half the moving amount of the sliding plate 38 and does not go so far as to bring the head face of the reproducing magnetic head 60 fixed on the head supporting member 39 into contact with the magnetic tape face of the installed cassette 8 (see FIG. 1).

In accordance with the movement of the sliding plate 38 and the head supporting member 39, the pinch roller 52 held on the sliding plate 38 by means of the support lever 53 is moved rearwardly in the same direction as that in which the magnetic head 60 is moved. This moving amount of the pinch roller 52 remains to be the same as that of the head supporting member 39 owing to the abutment of the headless screw 57 (see FIG. 14) of the supporting lever 53 against the bent piece 39f of the head supporting member 39. Accordingly, as in the case of the magnetic head 60, the pinch roller 52 does not also go so far as to contact the magnetic tape face.

By depressing the on operation button 9a of the main switch S in the above-mentioned manner, the pinch roller 52 and the reproducing magnetic head 60 are both brought to a condition ready for operation.

Figure 12:
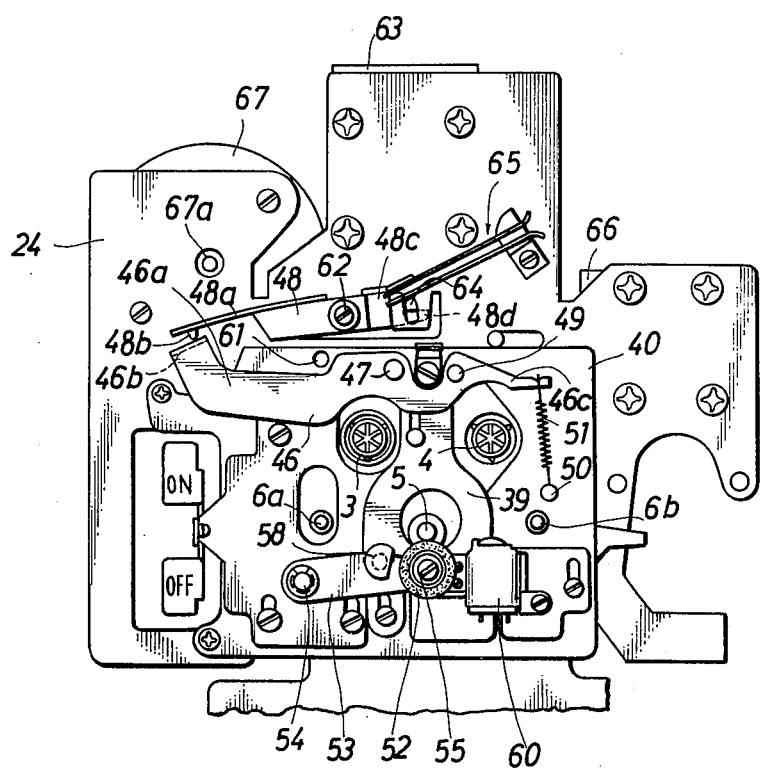
FIG. 12 is a plan view showing a condition, at the time of reproduction, wherein the operating members on the substrate are in operation.

Under the above-mentioned condition, the playback foot pedal 22 (see FIG. 1) is next depressed. Then, the foot switch $S_4$ shown in FIG. 9 has its movable contact piece changed over from one stationary terminal $S_{4b}$ to the other stationary terminal $S_{4c}$. Therefore, power supply to the playback solenoid 63 is made effective to operate the same. At this time, the plunger 63a of the solenoid 63 (see FIG. 5) is retreated into the solenoid 63, and therefore the pin 64 erected on the plunger 63a is also moved toward the solenoid 63. In accordance with the movement of the pin 64, as shown in FIG. 12, the pushing member 48 having its forked portion 48d fitted over the pin 64 is rocked counterclockwise about the support shaft 62, whereby the pushing element 48b of the one arm 48a of the pushing member 48 pushes the bent portion 46b of the connection lever 46 in the counterclockwise direction. When this bent portion 46b is pushed, the connection lever 46 is rocked counterclockwise about the support shaft 47 against the biasing force of the spring 51. When the connection lever 46 is rocked counterclockwise, the head supporting member 39 is moved by the pin 49 toward the rearward side of the transcriber body 1, namely toward the upward side of FIG. 12, thus to move over the remaining moving stroke approximately half the entire moving stroke.

When the head supporting member 39 is moved, the support lever 53 of the pinch roller 52 is rocked counterclockwise about the support shaft 54 by means of the tension spring 56 (see FIG. 14) in a manner following the head supporting member 39. Therefore, the pinch roller 52 is allowed to abut on the capstan 5 through the installed tape (not shown), and as a result the head face of the reproducing magnetic head 60 is also allowed to abut on the installed tape, whereby the pinch roller 52 and the reproducing magnetic head 60 are brought to a condition ready for operation.

Figure 13:
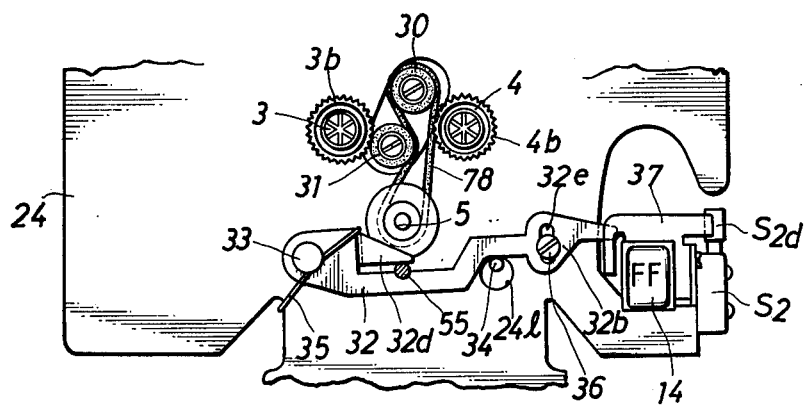
FIG. 13 is a plan view showing a condition, at the time of tape winding, wherein a tape driving force transmission mechanism is in operation.

On the other hand, when, as above described, the pinch roller 52 is displaced to a condition ready for operation, the downwardly extending portion of the support shaft 55 of the pinch roller 52 pushes, as shown in FIG. 13, the bent short arm 43d of the control lever 32, so that the control lever 32 is rocked counterclockwise about the support shaft 33 against the biasing force of the spring 35. The range of this rocking movement is defined or confined by the circularly arcuate elongate aperture 32e bored in the free end portion 32b of the control lever 32. When the free end portion 32b is rocked counterclockwise, the control pin 34 in abutment with the forward side edge of the free end portion 32b is made free therefrom. When the control pin 34 is freed, the change-over plate 69 having the control pin 34 erected thereon is rocked counterclockwise about the support shaft 77 against the biasing force of the spring 80.

Since, in accordance with the rocking movement of the change-over plate 69, the drive rollers 30, 31 provided thereon are rocked jointly therewith, one tape winding shaft driving roller 31 of those drive rollers 30, 31 is allowed to abut on the drive gear 3b of the tape winding shaft 3. Upon abutment of the roller 31 against the drive gear 3b, the main switch S is closed to drive the motor 67. The rotational force of the motor 67 thus driven is transmitted from the capstan 5 to the drive gear 3b through the belt 78 and the driving roller 31. As a result, the tape winding shaft 3 is driven to rock that tape hub 8a within the cassette 8 which is in engagement with the winding shaft 3, whereby the tape allowed to travel 64 the capstan 5 and the pinch roller 52 starts to be wound. Thus, in accordance with the tape travel, the output reproduced by the magnetic head 60 is amplified by the amplifier 94 (see FIG. 9) to be generated from the speaker 26 as a reproduced sound.

When the pin 64 is moved by operation of the solenoid 63, the switch 65 is closed by the pin 64 as shown in FIG. 12. As a result, the motor speed control input passed through the resistors $R_2$, $R_3$ shown in FIG. 9 is applied to the motor speed control input terminal of the control circuit 93, whereby the rotational speed of the motor 67 is automatically controlled to a specified value.

The transcriber performs the reproduction operation in the above-mentioned manner, and while the typist is hearing the reproduced sounds, he typewrites them.

By the way, in the case where, during this reproduction operation, the typist misses hearing some one or ones of the reproduced sounds or hears the missed part once again for confirmation immediately after completion of the reproduction operation, he has only to depress the backspace foot pedal 23 (see FIG. 1). When the foot pedal 23 is depressed, the foot switch $S_3$ shown in FIG. 9 has its movable contact piece changed over from one stationary terminal $S_{3b}$ to the other stationary terminal $S_{3c}$. At this time, power supply to the playback solenoid 63 is interrupted or made ineffective and instead power supply to the backspace solenoid 66 is made effective.

When the playback solenoid 63 ceases to be operated, the plunger 63a thereof is returned to its inoperative position. When this plunger is thus returned, the pushing member 48 is also rocked clockwise about the support shaft 62 and returned to its original position. As a result, the connection lever 46 is little rocked clockwise about the support shaft 47 due to the biasing force of the spring 51 to cause the head supporting member 39 to be moved forwards or downwardly of FIG. 12, thereby causing the pinch roller 52 and the magnetic head 60 to be displaced or brought to a condition ready for operation, shown in FIG. 11. Since, accordingly, the pinch roller 52 is separated from the capstan 5, the specified speed travel of the tape is stopped. Further, when the pinch roller 52 is separated from the capstan 5, the control lever 32 is also rocked, as shown in FIG. 4, counterclockwise about the support shaft 33 owing to the biasing force of the spring 35, so that the control pin 34 is pushed back by the free end portion 32b of the control lever 32, whereby the change-over plate 69 is rocked clockwise about the support shaft 77 against the biasing force of the spring 80, thereby causing separation of the drive roller 31 from the tape winding post 3.

On the other hand, when the backspace solenoid 66 is operated, the plunger 66a thereof is retreated into the solenoid against the biasing force of the spring 84.

When said retreatment is performed, the one end portion 81a of the spring 81 is pushed by means of the pin 83. Therefore, the rising piece 69c of the change-over plate 69 is pushed by said one end portion 81a of the spring 81, so that the change-over plate 69 is rocked clockwise abut the support shaft 77. In accordance with this rocking movement, the drive roller 30 on the change-over plate 69 is brought into contact with the drive gear 4b of the tape unwinding shaft 4 to cause rotation of the tape unwinding post 4. Since the direction in which the one drive roller 30 is rotated is opposite to that in which the other drive roller 31 is rotated, the tape unwinding post 4 is rotated reversely to the tape winding post 3, thereby causing rotation of the tape hub 8b (see FIG. 1) within the cassette 8, thus to rewind the tape once delivered. This tape-rewinding operation is carried out during the depression of the backspace pedal 23 (see FIG. 1). Accordingly, when the tape has been rewound by a desired amount thereof, the typist or operator has only to stop depressing the pedal 23 to then depress the playback pedal 22. When the pedal 23 depression is stopped, the backspace switch S$_3$, as shown in FIG. 9, has its movable contact piece changed over from said other stationary terminal S$_{3c}$ to said one stationary terminal S$_{3b}$ to make ineffective the power supply to the solenoid 66, whereby the plunger 66a and the pin 83 are returned to their respective initial positions by the action of the return spring 84. When this return movement is made, the change-over plate 69 is also rocked counterclockwise due to the biasing force of the spring 80 in accordance with that return movement of the plunger 66a and the pin 83, and thus is returned to a neutral position shown in FIG. 5. At this time, however, power supply to the playback solenoid 63 is already made effective to permit it to be brought to an operative condition. For this reason, the change-over plate 69 is passed through said neutral position and rocked counterclockwise to cause abutment of the drive roller 31 against the drive gear 3b of the tape rewinding shaft 3.

Further, when the playback solenoid 63 is made operative, the head supporting member 39, as above described, is moved rearwards or upwardly of FIG. 12 by the rocking movement of the connection lever 46 to cause the pinch roller 52 to abut on the capstan 5 through the tape and simulataneously to cause the magnetic head 60 to abut on the tape face. Therefore, the tape rewound by the action of the backspace solenoid is allowed to travel by the capstan 5 and the pinch roller 52 and is again reproduced by the magnetic head 60. Accordingly, the typist can hear once again the reproduced sounds he missed, or hear them once again for confirmation.

Hereinafter, explanation is made of the case where the tape is subjected to high speed travel or feed. In this case, the typist has only to take off his foot from the foot pedals 22, 23 and instead depress the tape high speed travel operation button 14 (see FIGS. 1, 3, 4 and 6) of the transcriber. When this depression is performed, the actuator S$_{2d}$ of the change-over switch S$_2$ is pushed by a forward end of the bent piece 37b of the switch on-off operation member 37 integral with the button 14, whereby the switch S$_2$ is changed over. Namely, in the electric circuit shown in FIG. 9, the movable contact piece of the switch S$_2$ is changed over from said other stationary terminal S$_{2c}$ to said one stationary terminal S$_{2b}$. When this change-over operation is effected, the power source output is connected directly to the motor 67 through the main switch S, tape rewinding change-over switch S$_1$ and resistor R$_1$. Accordingly, the motor 67 starts to make a high speed rotation without being controlled by the control circuit 93.

On the other hand, the other bent piece 37c of the switch on-off operation member 37 pushes the tip end portion 32c of the control lever 32 by its inclined portion, and therefore the control lever 32 is rocked counterclockwise about the support shaft 33 as shown in FIG. 13. When this rocking movement is made, the control pin 34 is made free. As a result, the change-over plate 69 (see FIG. 5) is rocked counterclockwise about the support shaft 77 owing to the biasing force of the spring 35 to cause abutment of the drive roller 31 fitted on the change-over plate 69, against the drive gear 3b of the tape winding post 3 as shown in FIG. 13. When this abutment is caused, the high speed rotation of the motor 67 is transmitted to the tape rewinding shaft 3 through the capstan 5, belt 78 and drive roller 31. Therefore, the tape winding post 3 makes a high speed rotation to wind the tape therearound. This tape winding operation continues to be performed during the depression of the tape high speed travel operation button 14. At this time, the magnetic head 60 and the pinch roller 52 do not contact the tape.

Hereinafter, explanation is made of the operation in the case where the tape wound by the tape winding shaft 3 around the same is rewound around the tape feed shaft, or tape rewinding shaft 4. In this case, the typist has only to depress the tape rewinding operation button 13 (see FIGS. 1, 3, 4 and 6) of the transcriber. When this depression is performed, the switch S$_1$ of the electric circuit of FIG. 9 has its movable contact piece changed over from said other stationary terminal S$_{1c}$ to said one stationary terminal S$_{1b}$ and simultaneously the switch S$_5$ thereof has its movable contact piece changed over from said one stationary terminal S$_{5b}$ to said other stationary terminal S$_{5c}$. When the switch S$_1$ is changed over, the output end of the power source is connected directly to the motor 67 through the resistor R$_1$, whereby the motor 67 starts to make a high speed rotation.

Further, when the switch S$_5$ is changed over, power supply to the backspace solenoid or tape rewinding solenoid 66 is rendered effective. When the solenoid 66 is made operative, the plunger 66a is retreated into the solenoid interior as in the case of the backspace solenoid operation to cause the change-over plate 69 to be rocked clockwise about the support shaft 77 through the pin 83 and the spring 81, thus to cause abutment of the drive roller 30 against the drive gear 4b of the tape rewinding post 4. When this abutment is accomplished, the high speed rotation force of the motor 67 is transmitted to the tape rewinding post 4 through the capstan 5, belt 78 and driving roller 30. Thus, the tape is rewound at high speed. Also at this time, the magnetic head 60 and the pinch roller 52 do not contact the tape.

Figure 16:
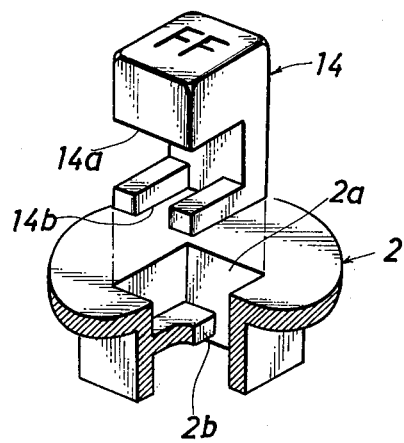
Figure 17:
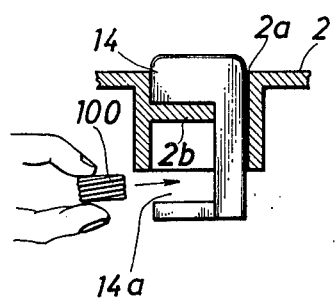

The above-mentioned embodiment referred to the case where as the high speed travel operation button 14 a one having such a conventional construction as shown in FIG. 8 was used. But if the button shown in FIGS. 15 to 17 is used, the button depressing operation will be able to be lightly performed and besides the maintenance and inspection thereof will become easy.

Figure 15:
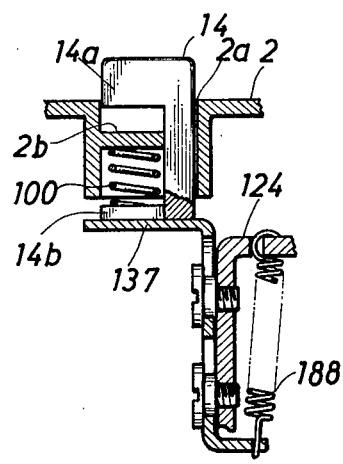

FIG. 15 shows a condition in which the operation button 14 is fitted to a rectangular aperture 2a of the dressing plate 2. The operation button 14, as shown in detail in FIG. 16, is provided at one side face thereof with a rectangular concave portion 14a and at the bottom thereof with a rectangular passing aperture 14b for being passed into the rectangular concave portion 14a. From an intermediate portion of one inner side face of the rectangular aperture 2a provided for the dressing plate 2 is projected a rectangular projecting piece 2b whose lateral width is narrower than that of the rectangular passing aperture 14b. Between the flat face of the projecting piece 2b and the lower side face of the rectangular concave portion 14a is interposed a compression spring 100. In FIG. 15, reference numerals 124, 137 and 188 denote substantially the same members as said substrate 24, said switch on-off operation member 37 and said tension spring 188, respectively. This tension spring 188 has a greater spring force than said compression spring 100. Normally, therefore, the operation button 14 is kept in an upper position or in an off-condition. When depressing the button 14 with fingers, it is lowered, whereby the switch-off operation member 137 is allowed to downwardly slide relative to the substrate 124 to perform a prescribed on-operation. When releasing the button 14, it is returned to its original upper position by the action of the spring 188.

When it is desired to assemble the above-constructed high speed travel operation button 14, it has only to be brought to its lowered position so that the spring 100 may be inserted into the concave portion 14a in a compressed condition.

As above described, the transcriber according to the invention is so constructed that the main switch S makes on on-off operation by using the seesaw moving member 42, and the pinch roller and reproducing megnetic head are brought or displaced to a condition ready for operation by timely utilizing the seesaw movement of the member 42, and thereafter the two solenoids 63, 66 are controlled by means of the foot switches S₃, S₄ to perform the tape reproducing and rewinding operation. Therefore, the present transcriber involves no unnecessary part in respect of construction. Besides, all of the necessary operation members are structurally concentrated on the upper and lower faces of the substrate 24. Therefore, the present transcriber construction can be made compact. Thus is provided a compact transcriber simple in construction as stated in the initial part of the specification.

The above-mentioned embodiment referred to the transcriber for which the microcassette 8 was used, but a transcriber for installment therein of other tape cassettes can be constructed by simply changing the position for disposing the capstan, pinch roller and magnetic head, and those skilled in the art would be able to perform such change of design very easily.

What we claim is:

1. In a transcriber having a control circuit provided with a main switch adopted to turn either on or off an electrical connection with a power source, a pinch roller, a capstan, a reproducing magnetic head, a winding shaft, and a rewinding shaft, the improvement comprising:

a sliding plate movable in response to the on-off operation of said main switch,
    a connection lever operatively connected to said sliding plate,
    a pinch roller supporting lever operatively connected to said connection lever and supporting said pinch roller,
    a head supporting member operatively connected to said connection lever and supporting said reproducing magnetic head,
    whereby when said main switch has been turned on, said sliding plate and connection lever are moved each by a prescribed amount, and in accordance with this movement said pinch roller supporting lever and head supporting member are moved to permit said pinch roller and magnetic head to be brought to a condition ready for operation,
    a playback solenoid,
    playback switching means for energizing and deenergizing said playback solenoid,
    a pushing member moved by energization of said playback solenoid to move said connection lever, thereby to cause said pinch roller and magnetic head to be brought to an operative position,
    a selectively rotating mechanism for rotating said winding shaft by energizing of said playback solenoid,
    a backspace solenoid operatively associated with said playback solenoid,
    back-space switching means for energizing and deenergizing said backspace solenoid,
    whereby when said backspace solenoid is energized, said playback solenoid is deenergized to permit said pinch roller and magnetic head to be brought to a condition ready for operation through said connection lever and said selectively rotating mechanism is caused to rotate said rewinding shaft.

2. A transcriber according to claim 1, wherein said selectively rotating mechanism includes a mechanism for rotating said winding shaft at high speed.

3. A transcriber according to claim 2, which further comprises a foot pedal switch for selectively operating said playback switch or said backspace switch.

4. A transcriber according to claim 1, wherein said selectively rotating mechanism includes a motor and a transmission mechanism for transmitting the rotational force of said motor selectively to said winding shaft or said rewinding shaft.

* * * * *